United States Patent
Umeda et al.

(10) Patent No.: US 12,462,621 B2
(45) Date of Patent: Nov. 4, 2025

(54) VEHICLE

(71) Applicant: SUBARU CORPORATION, Tokyo (JP)

(72) Inventors: Kazuki Umeda, Tokyo (JP); Yuuji Tanaka, Tokyo (JP); Shuji Maeda, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 205 days.

(21) Appl. No.: 17/830,903

(22) Filed: Jun. 2, 2022

(65) Prior Publication Data
US 2022/0319249 A1   Oct. 6, 2022

Related U.S. Application Data

(63) Continuation of application No. PCT/JP2021/013888, filed on Mar. 31, 2021.

(51) Int. Cl.
*G07C 5/04* (2006.01)
*G07C 5/00* (2006.01)

(52) U.S. Cl.
CPC .............. *G07C 5/04* (2013.01); *G07C 5/008* (2013.01)

(58) Field of Classification Search
CPC ........................................................ G07C 5/04
See application file for complete search history.

(56) References Cited

U.S. PATENT DOCUMENTS

| | | | | |
|---|---|---|---|---|
| 6,101,433 A | * | 8/2000 | Flicker, Jr. ............... | G07C 5/04 |
| | | | | 701/29.6 |
| 10,160,463 B1 | * | 12/2018 | Weaver ................. | B60W 40/08 |
| 10,814,784 B2 | * | 10/2020 | Pedersen ................ | G06V 20/56 |
| 10,991,245 B2 | * | 4/2021 | Olsen ............... | G08G 1/096741 |

(Continued)

FOREIGN PATENT DOCUMENTS

| JP | 2010-038652 A | 2/2010 |
|---|---|---|
| JP | 2012-118951 A | 6/2012 |

(Continued)

OTHER PUBLICATIONS

Office Action dated Jun. 18, 2024 from corresponding JP Application No. 2022-558593, 6 pages.

(Continued)

*Primary Examiner* — Jean Paul Cass
(74) *Attorney, Agent, or Firm* — Rimon P.C.

(57) ABSTRACT

A vehicle includes at least one driving operation unit configured to receive a driving operation of a driver of the vehicle; at least one sensor configured to detect a driving operation performed on the driving operation unit; and a control device configured to receive a signal input from the at least one sensor. The control device includes one or more processors; and one or more memories coupled to the one or more processors. The one or more processors are configured to derive driving result information for evaluating the driving operation, based on at least the signal input from the at least one sensor; execute processing for storing the derived driving result information in a storage device as history information; read the history information stored in the storage device; and output output information based on a comparison result between the derived driving result information and the read history information.

9 Claims, 13 Drawing Sheets

(56) References Cited

U.S. PATENT DOCUMENTS

| | | | |
|---|---|---|---|
| 11,422,551 B2* | 8/2022 | Swan | A61B 5/742 |
| 11,909,917 B2* | 2/2024 | Sharma | G06F 3/167 |
| 11,912,108 B2* | 2/2024 | Fragoso | B60H 1/00985 |
| 2009/0234552 A1 | 9/2009 | Takeda et al. | |
| 2010/0026476 A1 | 2/2010 | Yamaoka et al. | |
| 2019/0176837 A1* | 6/2019 | Williams | G06V 20/593 |
| 2019/0300002 A1* | 10/2019 | Fung | G07C 5/08 |
| 2019/0375382 A1* | 12/2019 | Nakatsuka | B60T 7/14 |
| 2020/0101981 A1* | 4/2020 | Phillips | G07C 5/085 |
| 2021/0182625 A1* | 6/2021 | Arar | G06V 10/82 |
| 2023/0166743 A1* | 6/2023 | Heck | G05B 13/027 |
| 2023/0343149 A1* | 10/2023 | Volos | G07C 5/04 |
| 2024/0015489 A1* | 1/2024 | Breaux, III | G06V 20/593 |

FOREIGN PATENT DOCUMENTS

| | | | |
|---|---|---|---|
| JP | 2013191230 A | * | 9/2013 |
| JP | 2014-089602 A | | 5/2014 |
| JP | 2015-141516 A | | 8/2015 |
| JP | 2019-093896 A | | 6/2019 |
| JP | 2020-009371 A | | 1/2020 |
| JP | 2020-201795 A | | 12/2020 |
| WO | 2007/077867 A1 | | 7/2007 |

OTHER PUBLICATIONS

Notice of Reasons for Refusal received in corresponding Japanese Patent Application No. 2022-558593, dated Feb. 6, 2024.

* cited by examiner

VEHICLE

CROSS REFERENCE TO RELATED APPLICATIONS

This application is continuation of International Application No. PCT/JP2021/013888, filed on Mar. 31, 2021, the entire contents of which are hereby incorporated by reference.

TECHNICAL FIELD

The present invention relates to a vehicle.

BACKGROUND ART

PTL 1 discloses a vehicle including an automobile driving function determination device. The automobile driving function determination device disclosed in PTL 1 determines a degree of risk of collision between the vehicle and an obstacle. Driving result information including information on the degree of risk is transmitted from the vehicle to a database. The database accumulates the driving result information of various drivers.

According to the above-described automobile driving function determination device, the driving result information of a driver of the vehicle is compared with the driving result information of a normal driver to obtain an objective evaluation of the driving of the driver.

CITATION LIST

Patent Literature

PTL 1: Japanese Unexamined Patent Application Publication No. 2020-201795

SUMMARY OF INVENTION

A vehicle according to an embodiment of the present invention includes:
  at least one driving operation unit configured to receive a driving operation of a driver who drives the vehicle;
  at least one sensor configured to detect the driving operation received by the at least one driving operation unit; and
  a control device configured to receive a signal input from the at least one sensor, in which
  the control device includes:
  one or more processors; and
  one or more memories coupled to the one or more processors, and
  the one or more processors are configured to:
  derive driving result information for evaluating the driving operation of the driver, based on at least the signal input from the at least one sensor;
  execute processing for storing the derived driving result information in a storage device as history information;
  read the history information stored in the storage device; and
  output output information based on a comparison result between the derived driving result information and the history information read from the storage device.

DESCRIPTION OF EMBODIMENTS

Figure 1:
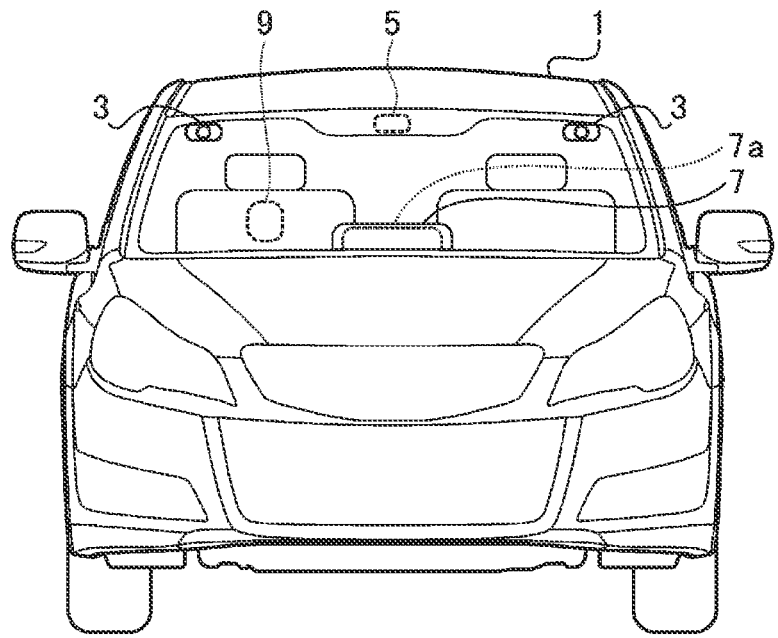
FIG. 1 is a diagram illustrating a vehicle of an embodiment of the invention.

It is difficult for a driver who drives a vehicle to notice a decline in driving skill in an evaluation based on comparison with others. Therefore, the above-described vehicle has a problem in that it is not possible to appropriately alert the driver.

An object of the present invention is to provide a vehicle capable of appropriately alerting a driver.

According to an embodiment of the present invention, it is possible to appropriately alert a driver.

Hereinafter, the embodiment of the present invention will be described in detail with reference to the accompanying drawings. Specific dimensions, materials, numerical values, and the like illustrated in the embodiment are merely examples for facilitating understanding of the invention, and do not limit the present invention unless otherwise specified. In this specification and the drawings, elements having substantially the same functions and configurations are denoted by the same reference numerals, and redundant description thereof will be omitted. In addition, elements that are not directly related to the present invention will not be illustrated in the drawings.

FIG. 1 is a diagram illustrating a vehicle 1 according to the present embodiment. As illustrated in FIG. 1, the vehicle 1 includes an exterior camera 3, an interior camera 5, a navigation system 7, and a measurement device 9. The exterior camera 3 is disposed, for example, in a cabin of the vehicle 1 and captures an image of a scene ahead of the vehicle 1. In other words, the exterior camera 3 captures an image of an exterior environment ahead of the vehicle 1. FIG. 1 illustrates two exterior cameras 3, 3. However, one exterior camera 3 or exterior cameras more than two may be disposed in the cabin of the vehicle 1.

The interior camera 5 is disposed in the cabin of the vehicle 1. The interior camera 5 is disposed on the front side of the cabin and captures an image of a scene behind the interior camera 5 from the front side of the cabin. The interior camera 5 mainly captures an image of the face of the driver who sits on a seat part of a driver's seat.

The navigation system 7 includes a display 7a. The navigation system 7 displays a map and a route to a destination on the display 7a.

The measurement device 9 is built in the seat part of the driver's seat and measures physical information of the driver. Here, the measurement device 9 measures the body temperature, heart rate, blood pressure, and the like of the driver as the physical information. The measurement device 9 may be any device that measures information related to the body of the driver, and information measured by the measurement device 9 is not limited. The measurement device 9 may not necessarily be built in the seat part of the driver's seat. The measurement device 9 may be configured to be detachably attached to the seat part. The measurement device 9 may be portable outside the vehicle 1.

Figure 2:
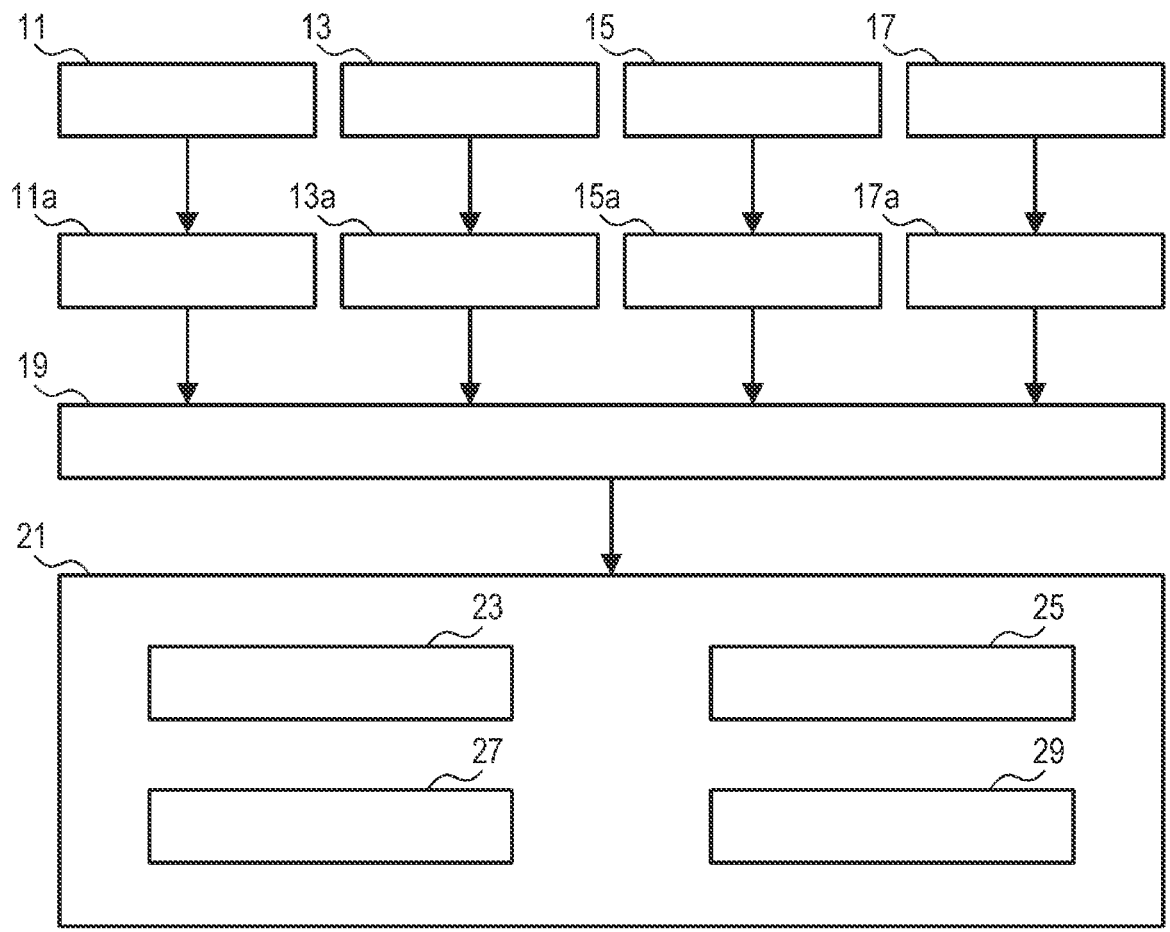
FIG. 2 is a diagram illustrating an example of a traveling system device included in the vehicle.

FIG. 2 is a diagram illustrating an example of a traveling system device included in the vehicle 1. In the present embodiment, the traveling system device mainly includes equipment, components, and devices provided to cause the vehicle 1 to travel. FIG. 2 illustrates a part of the traveling system device. The vehicle 1 includes a steering wheel 11, an accelerator pedal 13, a brake pedal 15, and a shift lever 17, which are disposed around the driver's seat. Here, the steering wheel 11, the accelerator pedal 13, the brake pedal 15, and the shift lever 17 are illustrated as examples of driving operation units that each receive an operation of the driver.

The steering wheel 11 receives a steering operation of the driver. The steering operation is a driving operation for turning the vehicle 1. The accelerator pedal 13 and the brake pedal 15 each receive a depression operation of the driver. Hereinafter, the depression operation of the accelerator pedal 13 is referred to as an accelerator operation, and the depression operation of the brake pedal 15 is referred to as a brake operation. The accelerator operation is a driving operation for accelerating the vehicle 1. The brake operation is a driving operation for decelerating the vehicle 1.

The shift lever 17 receives a shift position switching operation performed by the driver. In the present embodiment, the vehicle 1 is an automatic transmission vehicle and shift positions such as a drive position and a parking position are switched by the driver's switching operation. However, when the vehicle 1 is a manual transmission vehicle, gears in transmission are shifted by the driver's switching operation. Hereinafter, the driving operation performed on the shift lever 17 is referred to as a shift operation.

The vehicle 1 also includes a first sensor 11a, a second sensor 13a, a third sensor 15a, and a fourth sensor 17a. Here, the first sensor 11a, the second sensor 13a, the third sensor 15a, and the fourth sensor 17a are illustrated as examples of sensor that detect an operation of the respective driving operation units.

The first sensor 11a detects the steering operation, that is, a steering angle of the steering wheel 11. The second sensor 13a detects the accelerator operation, that is, an amount of depression of the accelerator pedal 13. The third sensor 15a detects the brake operation, that is, an amount of depression of the brake pedal 15. The fourth sensor 17a detects the shift operation, that is, the shift position of the shift lever 17.

The vehicle 1 includes an electronic control unit 19. The electronic control unit 19 receives detection signals from the first sensor 11a, the second sensor 13a, the third sensor 15a, and the fourth sensor 17a. The electronic control unit 19 controls control targets 21 based on the detection signals input from the sensors.

Here, an engine 23, a power steering device 25, a brake device 27, and a transmission device 29 are illustrated as an example of the control targets 21. That is, the control targets 21 are equipment, components, and/or devices that generate, transmit, and/or convert power for the vehicle 1 to travel. The electronic control unit 19 includes a plurality of control modules for controlling the control targets 21. An example of the control modules is an engine control module that controls the engine 23. That is, the electronic control unit 19 performs control related to traveling of the vehicle 1.

The vehicle 1 further includes a control device 100 in addition to the electronic control unit 19. The control device 100 is a device that evaluates the driving skill of the driver. More specifically, the control device 100 determines a decline in the driving skill of the driver and notifies the driver of the decline. Hereinafter, the control device 100 will be described in detail.

Figure 3:
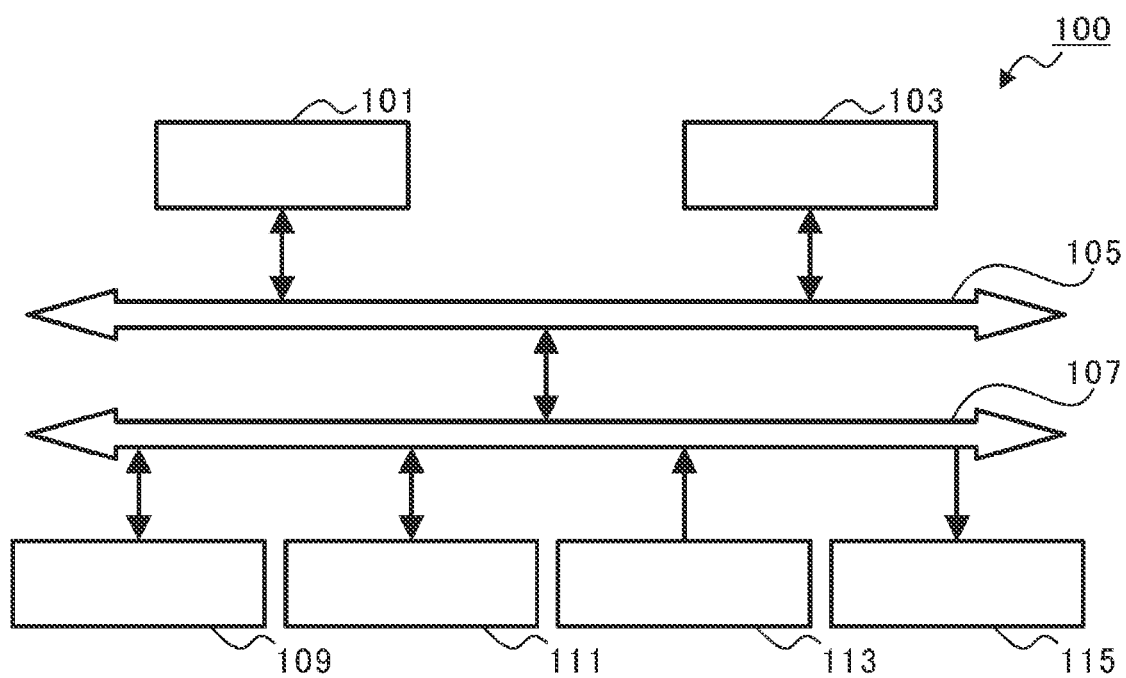
FIG. 3 is a diagram illustrating a hardware configuration of a control device included in the vehicle.

FIG. 3 is a diagram illustrating a hardware configuration of the control device 100. The control device 100 includes a processor 101. The processor 101 includes, for example, a CPU (Central Processing Unit). The control device 100 may include processors where each of the processors may be the processor 101.

Further, the control device 100 includes a memory 103 coupled to the processor 101. The memory 103 includes, for example, a ROM (Read Only Memory) serving as a storage element that stores a program, an arithmetic parameter, and the like used by the CPU, and a RAM (Random Access Memory) serving as a storage element that temporarily stores a parameter or the like that appropriately changes during execution of the CPU. The control device 100 may include memories where each of the memories may be the memory 103.

In any case, the control device 100 include at least one processor 101 and at least one memory 103 coupled to the at least one processor 101. The control device 100 further includes a bus 105 and an input/output interface 107.

The bus 105 couples the processor 101 and the memory 103 to each other. The input/output interface 107 is coupled to the bus 105. A storage device 109, a communication device 111, an input device 113, and an output device 115 are coupled to the input/output interface 107. Therefore, the processor 101 and the memory 103 are coupled to the storage device 109, the communication device 111, the input device 113, and the output device 115 via the bus 105 and the input/output interface 107.

The storage device 109 includes, for example, a semiconductor memory such as a DRAM (Dynamic Random Access Memory). The storage device 109 stores various types of data. The storage device 109 may be disposed in the control device 100, or may be coupled to the control device 100 in a wired or wireless manner. Further, the storage device 109 may be disposed in a server coupled to the vehicle 1 via a network line.

The communication device 111 is a device that transmits and receives various types of data via a communication network.

The input device 113 is equipment, a component, or a device that is coupled to the control device 100 and inputs a signal to the control device 100.

The output device 115 includes at least one of a display device or a speaker. Here, the display 7a of the navigation system 7 functions as the output device 115. However, the output device 115 may be a dedicated device of the control device 100.

Figure 4:
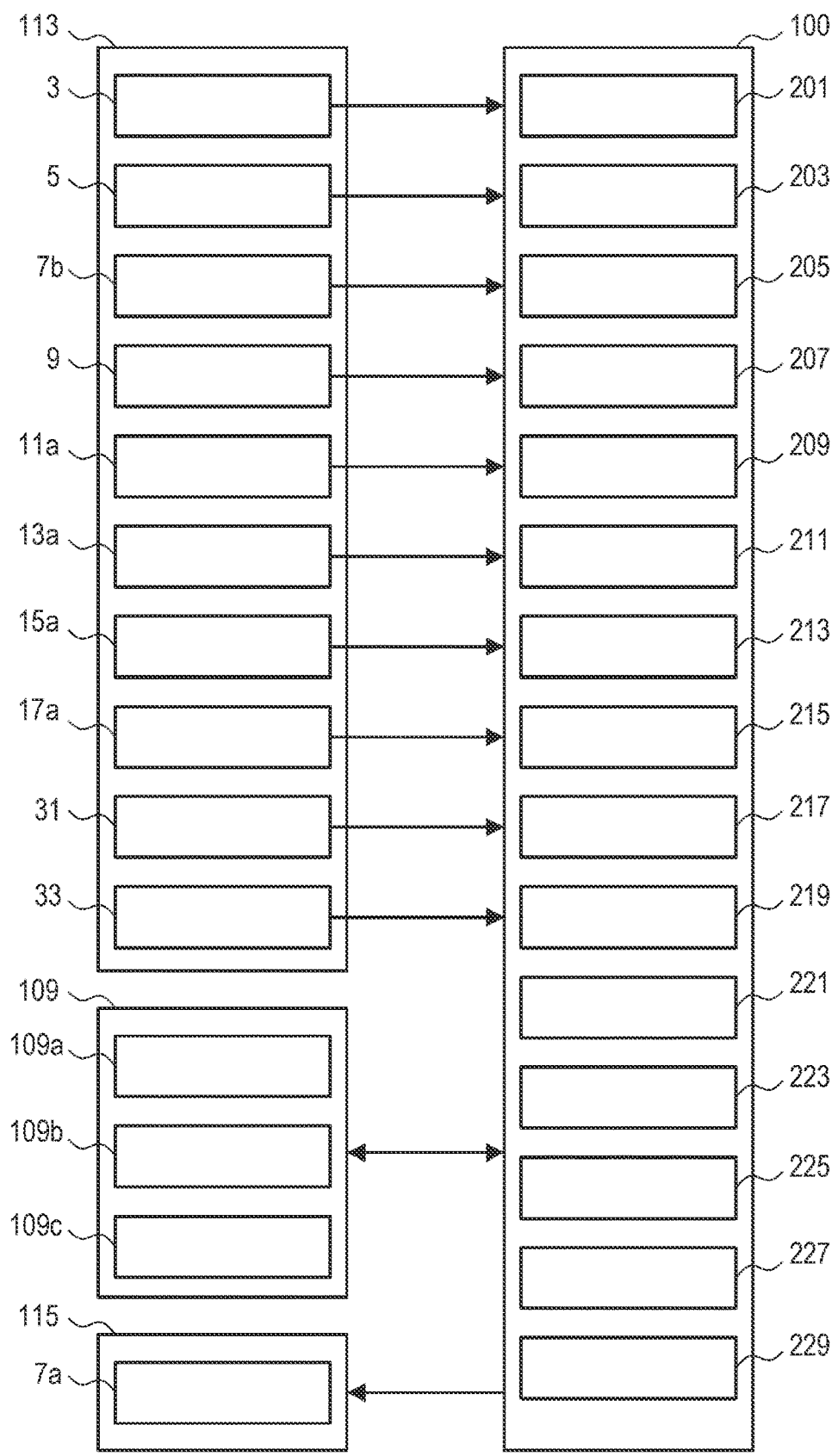
FIG. 4 is a functional block diagram of the control device.

FIG. 4 is a functional block diagram of the control device 100. As illustrated in FIG. 4, the control device 100 is coupled to the input device 113 which includes at least one of the exterior camera 3, the interior camera 5, an operation receiving unit 7b disposed in the navigation system 7, the measurement device 9, the first sensor 11a, the second sensor 13a, the third sensor 15a, the fourth sensor 17a, a vehicle speed sensor 31, and a radar sensor 33. FIG. 4 illustrates an example of a configuration of the input device 113. Note that various pieces of information are also input to the control device 100 from the input device 113 which includes the other devices not illustrated in FIG. 4.

Exterior information that is an image of a scene ahead of the vehicle 1 is input to the control device 100. The image is captured by the exterior camera 3. Interior information that is an image of a scene within the cabin is input to the control device 100. The image is captured by the interior camera 5.

An operation signal of the operation receiving unit 7b is input to the control device 100. The operation receiving unit 7b receives an operation performed on the navigation system 7 by the driver or the like. For example, the operation receiving unit 7b may include at least one of a touch panel stacked on the display 7a, a button, a keyboard, or a mouse. In addition, the operation receiving unit 7b may include a microphone to which voices of the driver or the like are input.

The physical information measured by the measurement device 9 is input to the control device 100 through wireless communication or wired communication. Steering angle information indicating the steering angle of the steering wheel 11, which is detected by the first sensor 11a, is input to the control device 100. Accelerator information indicating the amount of depression of the accelerator pedal 13, which is detected by the second sensor 13a, is input to the control device 100. Brake information indicating the amount of depression of the brake pedal 15, which is detected by the third sensor 15a, is input to the control device 100. Shift information indicating the shift position of the shift lever 17, which is detected by the fourth sensor 17a, is input to the control device 100.

The vehicle speed sensor 31 detects the current speed of the vehicle 1. Vehicle speed information that includes information on the current speed is input to the control device 100 from the vehicle speed sensor 31.

The radar sensor 33 is disposed in a front portion of the vehicle 1 and measures a vehicle-to-vehicle distance between the vehicle 1 and a preceding vehicle or the like. Vehicle-to-vehicle distance information that includes information on the vehicle-to-vehicle distance is input to the control device 100 from the radar sensor 33. The radar sensor 33 may also serve as a vehicle-to-vehicle distance control device, or may be a dedicated device of the control device 100. When the vehicle-to-vehicle distance control device is mounted on the vehicle 1, the vehicle-to-vehicle distance information may be input from the vehicle-to-vehicle distance control device to the control device 100.

The storage device 109 is coupled to the control device 100. The control device 100 can store information in the storage device 109. Further, the control device 100 can read information stored in the storage device 109. The storage device 109 includes a temporary storage area 109a, a history information storage area 109b, and a vehicle type information storage area 109c. Details of the temporary storage area 109a, the history information storage area 109b, and the vehicle type information storage area 109c will be described later.

The display 7a of the navigation system 7 is coupled to the control device 100 as the output device 115. The control device 100 executes an image display process for displaying an image on the display 7a.

Here, many modules are stored in the memory 103 of the control device 100. The processor 101 operates the modules of the memory 103, based on signals and information input from the input device 113, and executes various types of arithmetic processing. The processor 101 operates the various modules to function as functional units described below.

The functional units include an exterior information deriving unit 201, a travel information deriving unit 203, an operation information deriving unit 205, an appropriateness information deriving unit 207, a determination unit 209, a timer unit 211, an inappropriate operation information accumulation unit 213, a driving result information deriving unit 215, a driving result information storage unit 217, a history information reading unit 219, a difference deriving unit 221, an output information generation unit 223, a driver identification unit 225, a measurement unit 227, and an output unit 229.

The exterior information deriving unit 201 acquires exterior information input from the exterior camera 3 and stores the exterior information in the temporary storage area 109a. The exterior information deriving unit 201 stores the exterior information at predetermined time intervals. The exterior information deriving unit 201 stores pieces of the exterior information in time series within a range of a predetermined upper limit number. When the number of the pieces of the exterior information reaches the upper limit number, the pieces of the exterior information are discarded in order from the oldest one. The pieces of the exterior information indicate, for example, a vehicle ahead of the vehicle 1, a traffic light, and a travel lane. The exterior information deriving unit 201 compares the pieces of the exterior information stored in time series and derives a displacement among the pieces of the exterior information. At least two pieces of the exterior information are stored in the temporary storage area 109a.

The travel information deriving unit 203 acquires travel information usable for determining a travel state of the vehicle 1, and stores the travel information in the temporary storage area 109a. The travel information deriving unit 203 stores the travel information at predetermined time intervals. Examples of the travel information include the vehicle speed information input from the vehicle speed sensor 31 and acceleration information input from an acceleration sensor (not illustrated). The travel information deriving unit 203 stores pieces of travel information in time series within a range of a predetermined upper limit number. When the number of pieces of the travel information reaches the upper limit number, the pieces of the travel information are discarded in order from the oldest one. The travel information deriving unit 203 compares the pieces of the travel information stored in time series and derives a displacement among the pieces of the travel information. At least two pieces of the travel information are stored in the temporary storage area 109a.

The operation information deriving unit 205 acquires driving operation information indicating driving operations performed on the control targets 21 and stores the driving operation information in the temporary storage area 109a. The operation information deriving unit 205 stores the driving operation information at predetermined time intervals. Examples of the driving operation information include the steering angle information, the accelerator information, the brake information, and the shift information, which are input respectively from the first sensor 11a, the second sensor 13a, the third sensor 15a, and the fourth sensor 17a. The operation information deriving unit 205 stores pieces of the driving operation information in time series within a range of a predetermined upper limit number. When the number of the pieces of the driving operation information reaches the upper limit number, the pieces of the driving operation information are discarded in order from the oldest one. The operation information deriving unit 205 compares the pieces of the driving operation information stored in time series and derives a displacement among the pieces of the driving operation information. At least two pieces of the driving operation information are stored in the temporary storage area 109a.

The appropriateness information deriving unit 207 derives appropriateness information based on the displacement among the pieces of the exterior information, which is derived by the exterior information deriving unit 201, and the displacement among the pieces of the travel information, which is derived by the travel information deriving unit 203. In the present embodiment, the appropriateness information is information indicating an appropriate driving operation of any driving operation unit. The appropriate driving operation includes at least one of an appropriate operation timing of the driving operation unit, operation amount of the driving operation unit, or operation time of the driving operation unit.

For example, the appropriateness information deriving unit 207 derives, as the appropriateness information, an appropriate brake timing indicating an appropriate timing at which the brake pedal 15 is depressed and a required brake amount indicating an appropriate amount of depression of the brake pedal 15. Further, the appropriateness information deriving unit 207 derives, as the appropriateness information, an appropriate steering timing indicating an appropriate timing at which the steering wheel 11 is operated and an optimal steering angle indicating an appropriate steering angle of the steering wheel 11.

The determination unit 209 determines whether the driver is performing the appropriate driving operation. Specifically, the determination unit 209 determines whether the driver is performing the appropriate driving operation, based on the appropriateness information derived by the appropriateness information deriving unit 207 and the driving operation information derived by the operation information deriving unit 205. Further, the determination unit 209 determines whether a driving operation of the driver considered to be inappropriate, such as sudden acceleration or sudden turning, has been performed, based on the driving operation information derived by the operation information deriving unit 205.

The timer unit 211 measures a delay time that is a period from the appropriate brake timing to timing when the brake operation is input. Further, the timer unit 211 measures a delay time from the appropriate steering timing to input of the steering operation.

The inappropriate operation information accumulation unit 213 stores inappropriate operation information in the temporary storage area 109a. The inappropriate operation information includes the delay time measured by the timer unit 211. The inappropriate operation information accumulation unit 213 may store the delay time and the current time in the temporary storage area 109a in association with each other. In the temporary storage area 109a, a plurality of pieces of the inappropriate operation information are accumulated in time series.

The inappropriate operation information also includes number-of-times information indicating the number of times a driving operation considered to be inappropriate has been performed. The inappropriate operation information accumulation unit 213 updates the number-of-times information when the determination unit 209 determines that the driving operation of the driver considered to be inappropriate, such as sudden acceleration or sudden turning, has been performed.

The driving result information deriving unit 215 derives driving result information for evaluating the driving operation of the driver. The driving result information deriving unit 215 calculates a score based on the inappropriate operation information accumulated in the temporary storage area 109a. In one example, the driving result information deriving unit 215 calculates the score by summing up the delay times stored in the temporary storage area 109a. In another example, the driving result information deriving unit 215 calculates the score based on the number-of-times information stored in the temporary storage area 109a. That is, the driving result information deriving unit 215 derives the score as the driving result information.

The driving result information storage unit 217 stores the driving result information derived by the driving result information deriving unit 215 in the history information storage area 109b. The driving result information is associated with the physical information and date and time information. Further, the driving result information is stored in association with driver identification information. The driver identification information is information for identifying the driver, and is, for example, a driver ID set for each face authentication image of the driver. The driving result information storage unit 217 stores the driving result information in association with the driver ID. In the history information storage area 109b, a plurality of pieces of driving result information are stored in time series for each driver ID. Further, the driving result information may include one or both of the delay time and the number-of-times information. Hereinafter, the driving result information stored in the history information storage area 109b is referred to as history information.

The history information reading unit 219 reads one of the pieces of history information stored in the history information storage area 109b in accordance with a predetermined reading condition. In one example, a comparison date going back a predetermined number of days from the current date and time, such as a year ago or half a year ago, is determined. In this case, the history information reading unit 219 may read one of the pieces of driving result information associated with one of the pieces of date and time information closest to the comparison date. Furthermore, the history information reading unit 219 may read one of the pieces of history information associated with one of the pieces of the physical information most similar to one of the pieces of the physical information associated with the latest one of the pieces of driving result information.

The difference deriving unit 221 derives a difference between one of the pieces of driving result information derived by the driving result information deriving unit 215 and the one of the pieces of the history information read by the history information reading unit 219. In other words, the difference deriving unit 221 compares the one of the pieces of the driving result information with the one of the pieces of the history information.

The output information generation unit 223 generates output information. The output information may be, for example, information suggesting the decline in the driving skill or information suggesting that the driver give up his/her driver's license or stop driving. The output information may include at least one of the score, which is the driving result information, a transition of the score, or a ranking based on the score.

The output information may also include proposal information of a vehicle type. For example, the vehicle type proposed by the proposal information may be varied depending on the driving result information or the difference. As an example, as the score becomes worse, a vehicle type in which a driving support system has more functions is proposed. In addition, for example, in a case where the delay time is included in the driving result information, when there is a delay in the brake operation, a vehicle type having high damage mitigation brake performance is proposed.

Further, when there is a delay in the steering operation, a vehicle type having high lane departure suppression performance is proposed. Further, when there is a delay in both the brake operation and the steering operation, a vehicle type having high damage mitigation brake performance and high lane departure suppression performance is proposed. Further, for example, in a case where a vehicle type that can be proposed is selectable from vehicle types having the same level of functions, the vehicle type information of the vehicle 1 may be acquired, and the vehicle type that is the same level as the vehicle type of the vehicle 1 or smaller than the vehicle type of the vehicle 1 may be selectively proposed.

The vehicle type information on vehicle types is stored in the vehicle type information storage area 109c. In addition, the vehicle type information storage area 109c stores vehicle type selection information. The vehicle type selection information includes information on the delay time, the number-of-times information, and the difference. That is, the vehicle type selection information includes information on the degree of decline in the driving skill, the score, and the like are associated with the vehicle type. The output information generation unit 223 can extract any vehicle type information based on the vehicle type selection information and generate output information based on the extracted vehicle type information.

The driver identification unit 225 identifies the driver. Specifically, the driver identification unit 225 analyzes interior image information input from the interior camera 5 and identifies the driver.

The measurement unit 227 analyzes the physical information input from the measurement device 9 and stores the physical information in the temporary storage area 109a.

The output unit 229 outputs the output information generated by the output information generation unit 223. For example, the output unit 229 displays an image, which is the generated output information, on the display 7a.

Next, processes executed by the functional units will be described in detail.

Figure 5:
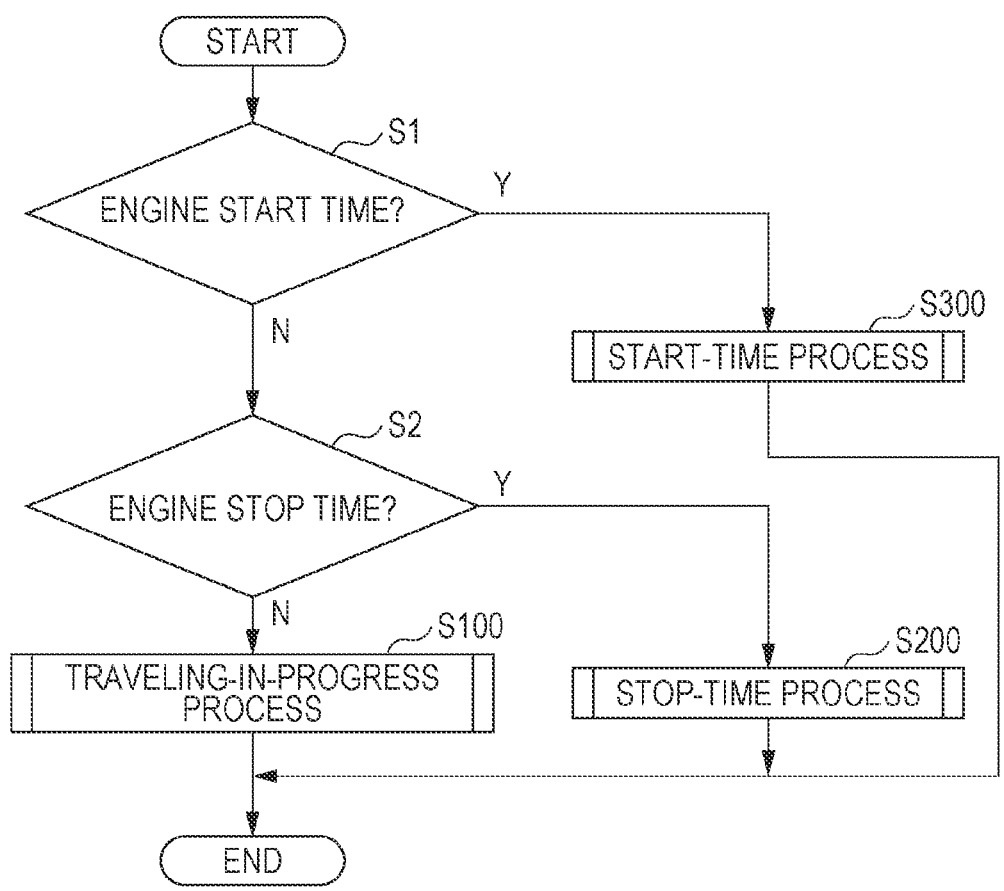
FIG. 5 is a diagram illustrating an example of an interrupt process.

FIG. 5 is a diagram illustrating an example of an interrupt process. The processor 101 repeatedly executes the interrupt process illustrated in FIG. 5 at predetermined time intervals while the engine 23 is driven. When the start operation of the engine 23 is not input (NO in S1) and the stop operation of the engine 23 is not input (NO in S2), the processor 101 executes a traveling-in-progress process (S100). When the stop operation of the engine 23 is input (YES in S2), the processor 101 executes a stop-time process (S200). When the start operation of the engine 23 is input (YES in S1), the processor 101 executes a start-time process (S300).

Figure 6:
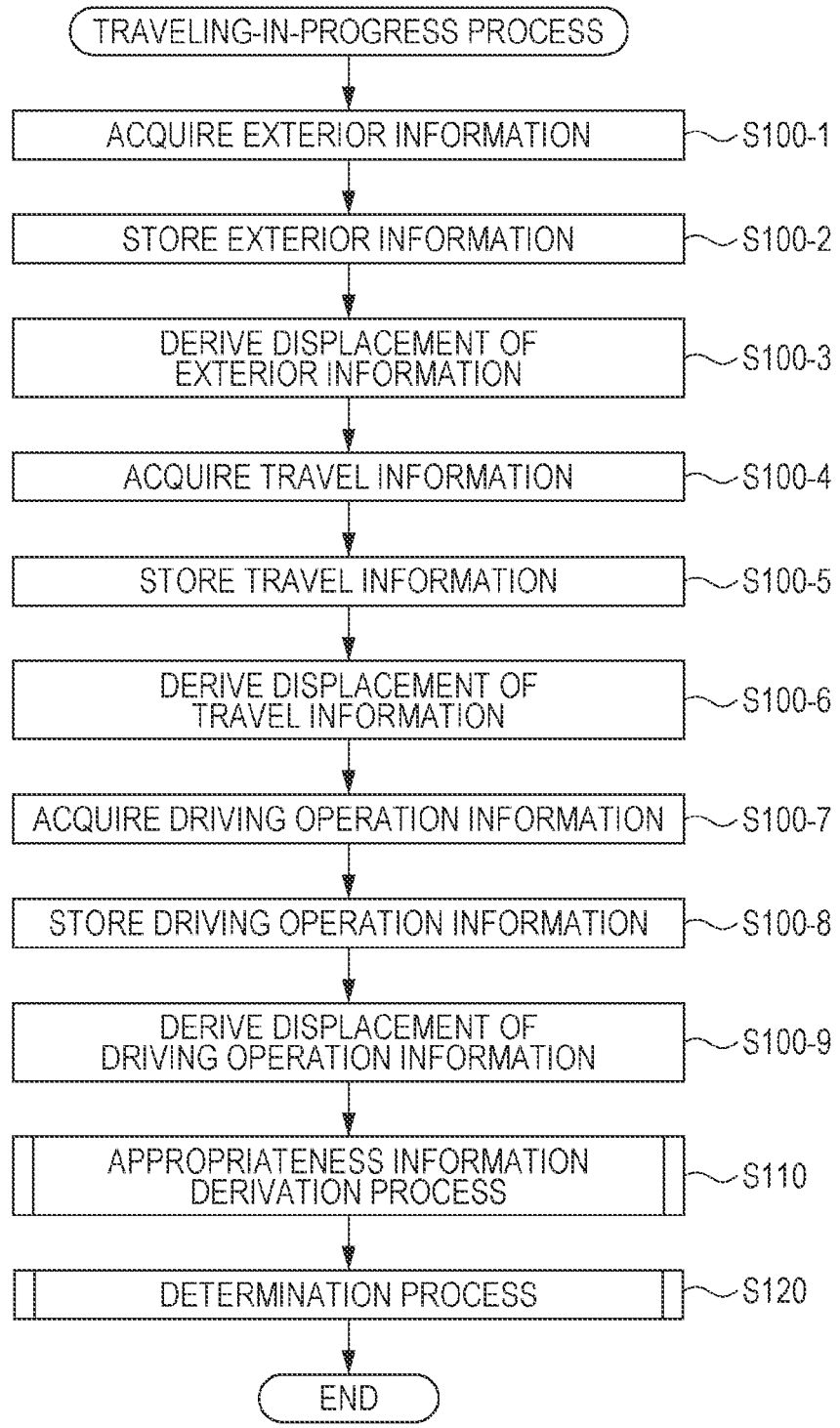
FIG. 6 is a diagram illustrating an example of a traveling-in-progress process.

FIG. 6 is a diagram illustrating an example of the traveling-in-progress process. The exterior information deriving unit 201 acquires the exterior information from the exterior camera 3 (S100-1). Next, the exterior information deriving unit 201 stores the acquired exterior information as newly stored exterior information in the temporary storage area 109a (S100-2). Next, the exterior information deriving unit 201 derives a displacement between the newly stored exterior information and the immediately preceding stored exterior information which is one of the pieces of the exterior information stored immediately before the newly stored exterior information in the temporary storage area 109a (S100-3).

Next, the travel information deriving unit 203 acquires the travel information usable for determining a travel state (S100-4). Next, the travel information deriving unit 203 stores the acquired travel information as newly stored travel information in the temporary storage area 109a (S100-5). Next, the travel information deriving unit 203 derives a displacement between the newly stored travel information and the immediately preceding travel information which is one of the pieces of the travel information stored immediately before the newly stored travel information in the temporary storage area 109a (S100-6).

Next, the operation information deriving unit 205 acquires the driving operation information usable for determining a driving operation (S100-7). Here, the operation information deriving unit 205 acquires the steering angle information, the accelerator information, the brake information, the shift information, and the like, which are input from the first sensor 11a, the second sensor 13a, the third sensor 15a, and the fourth sensor 17a. Next, the operation information deriving unit 205 stores the acquired driving operation information as newly stored driving operation information in the temporary storage area 109a (S100-8). Next, the operation information deriving unit 205 derives a displacement between the newly stored driving operation information and the immediately preceding driving operation information which is one of the pieces of the driving operation information stored immediately before the newly stored driving operation information in the temporary storage area 109a (S100-9).

Next, the appropriateness information deriving unit 207 executes an appropriateness information derivation process (S110). The appropriateness information derivation process (S110) will be described later with reference to FIGS. 7 to 9. Next, the determination unit 209 executes a determination process (S120). The determination process (S120) will be described later with reference to FIGS. 10 to 12.

Figure 7:
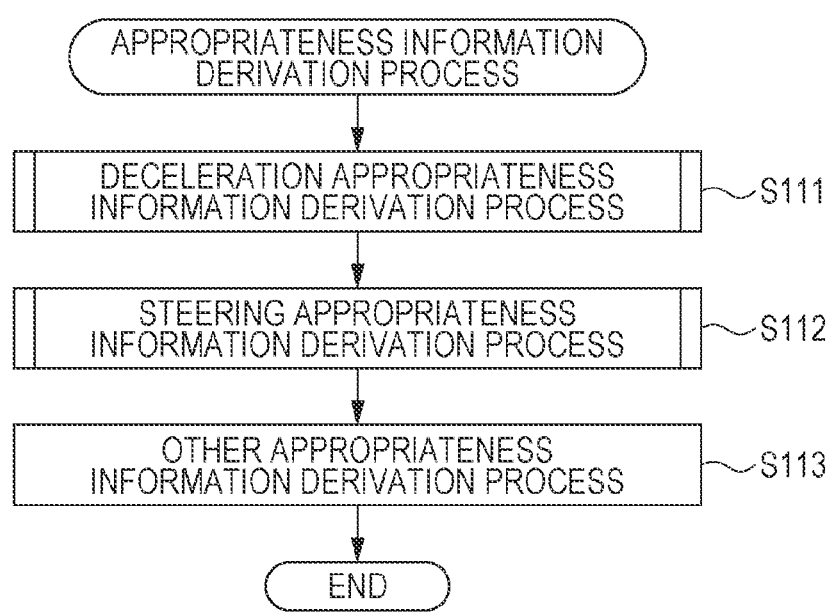
FIG. 7 is a diagram illustrating an example of an appropriateness information derivation process.

FIG. 7 is a diagram illustrating an example of the appropriateness information derivation process. In the appropriateness information derivation process, the appropriateness information deriving unit 207 sequentially executes a deceleration appropriateness information derivation process (S111), a steering appropriateness information derivation process (S112), and an other appropriateness information derivation process (S113). Note that the order of the processes in the appropriateness information derivation process (S110) can be changed as appropriate.

Figure 8:
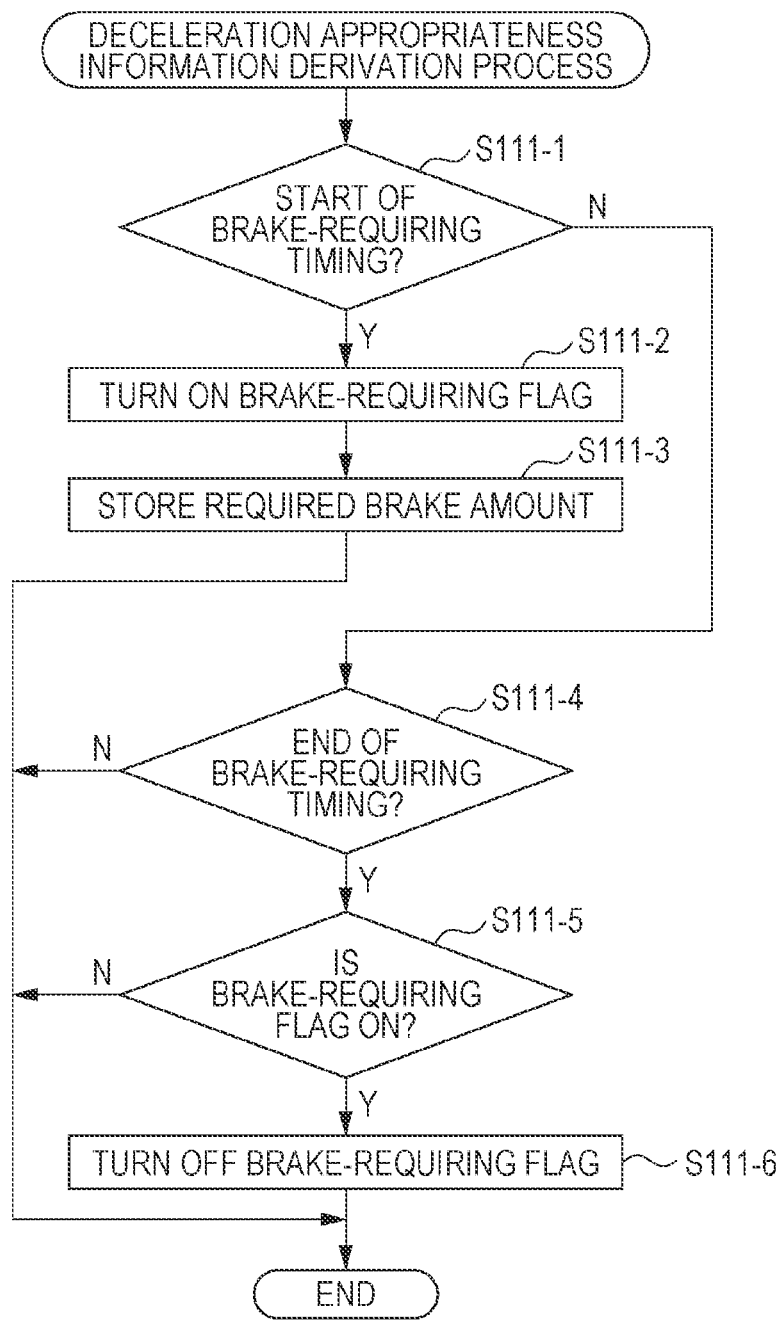
FIG. 8 is a diagram illustrating an example of a deceleration appropriateness information derivation process.

FIG. 8 is a diagram illustrating an example of the deceleration appropriateness information derivation process. The appropriateness information deriving unit 207 determines whether it is time to start a brake-requiring timing, which is a timing at which the brake operation is to be performed, based on the displacement of the exterior information derived in S100-3 and the displacement of the travel information derived in S100-(S111-1). That is, here, the appropriateness information deriving unit 207 determines whether it is a timing at which the brake operation is to be started.

For example, when the vehicle-to-vehicle distance between the vehicle 1 and the preceding vehicle is small, the appropriateness information deriving unit 207 determines that it is time to start the brake-requiring timing. Further, based on the exterior information, when the traffic light ahead is red, the appropriateness information deriving unit 207 determines that it is time to start the brake-requiring timing. Here, in a case where the brake operation has not been performed, the appropriateness information deriving unit 207 determines that it is time to start the brake-requiring timing. In addition, for example, even during the brake operation, when it is necessary to increase the braking force more than the current braking force by further depressing the brake pedal 15, the appropriateness information deriving unit 207 can determine that it is time to start the brake-requiring timing.

When determining that it is time to start the brake-requiring timing (YES in S111-1), the appropriateness information deriving unit 207 turns on a brake-requiring flag (S111-2). Next, the appropriateness information deriving unit 207 derives the required brake amount and stores the required brake amount in the temporary storage area 109*a* (S111-3). The required brake amount is, for example, the amount of depression of the brake pedal 15.

When determining that it is not time to start the brake-requiring timing (NO in S111-1), the appropriateness information deriving unit 207 determines whether it is time to end the brake-requiring timing, based on the displacement of the exterior information derived in S100-3 and the displacement of the travel information derived in S100-6 (S111-4). When the braking amount reaches the required brake amount after the start of the brake-requiring timing, the appropriateness information deriving unit 207 determines that it is time to end the brake-requiring timing.

When it is time to end the brake-requiring timing (YES in S111-4) and the brake-requiring flag is on (YES in S111-5), the appropriateness information deriving unit 207 turns off the brake-requiring flag (S111-6).

Figure 9:
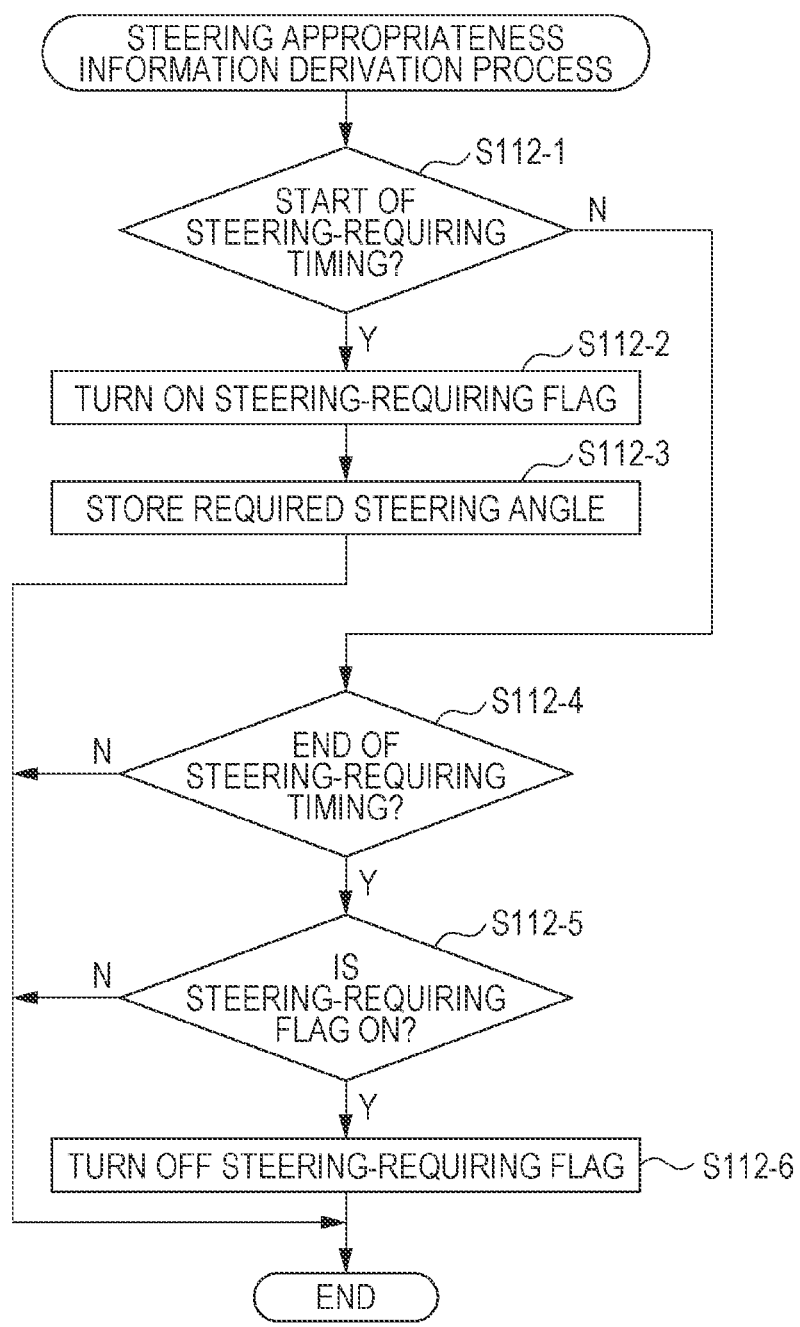
FIG. 9 is a diagram illustrating an example of a steering appropriateness information derivation process.

FIG. 9 is a diagram illustrating an example of the steering appropriateness information derivation process. The appropriateness information deriving unit 207 determines whether it is time to start a steering-requiring timing, which is a timing at which the steering operation is to be performed, based on the displacement of the exterior information derived in S100-3 and the displacement of the travel information derived in S100-6 (S112-1). That is, here, the appropriateness information deriving unit 207 determines whether it is a timing at which the steering operation is to be started.

Note that the appropriateness information deriving unit 207 can determine that the road is a curve by, for example, analyzing a lane of a roadway where the vehicle 1 is traveling, based on the exterior information. When the road is a curve, the appropriateness information deriving unit 207 determines that it is time to start the steering-requiring timing, based on the current speed of the vehicle 1, the presence or absence of the steering operation, and the like. Here, when the steering operation is not performed, the appropriateness information deriving unit 207 determines that it is time to start the steering-requiring timing. In addition, for example, even during the steering operation, when it is necessary to further increase the steering angle, the appropriateness information deriving unit 207 can determine that it is time to start the steering-requiring timing.

When determining that it is time to start the steering-requiring timing (YES in S112-1), the appropriateness information deriving unit 207 turns on a steering-requiring flag (S112-2). Next, the appropriateness information deriving unit 207 derives a required steering angle and stores the required steering angle in the temporary storage area 109*a* (S112-3).

When determining that it is not time to start the steering-requiring timing (NO in S112-1), the appropriateness information deriving unit 207 determines whether it is time to end the steering-requiring timing, based on the displacement of the exterior information derived in S100-3 and the displacement of the travel information derived in S100-6 (S112-4). When the steering angle reaches the required steering angle after the start of the steering-requiring timing, the appropriateness information deriving unit 207 determines that it is time to end the steering-requiring timing.

When it is time to end the steering-requiring timing (YES in S112-4) and the steering-requiring flag is on (YES in S112-5), the appropriateness information deriving unit 207 turns off the steering-requiring flag (S112-6).

In the appropriateness information derivation process (S110), as described above, in the deceleration appropriateness information derivation process (S111), the appropriateness information deriving unit 207 determines whether it is a timing at which the brake operation is to be performed. Further, in the steering appropriateness information derivation process (S112), the appropriateness information deriving unit 207 determines whether it is a timing at which the steering operation is to be performed. In the other appropriateness information derivation process (S113), the appropriateness information deriving unit 207 determines whether it is a timing at which any other driving operation other than the brake operation and the steering operation is to be performed. Examples of the timing determined in S113 include a timing at which the shift position is to be switched, and a timing at which the direction indicator is to be turned on.

Figure 10:
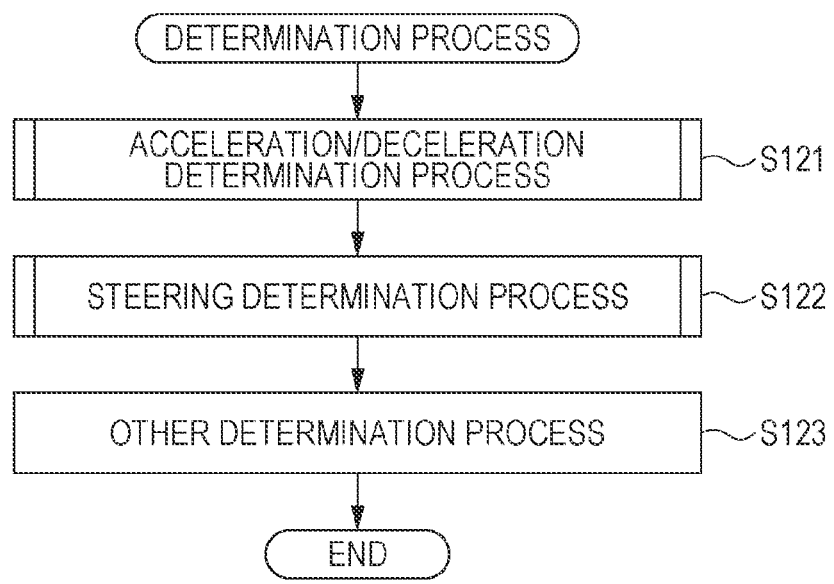
FIG. 10 is a diagram illustrating an example of a determination process.

FIG. 10 is a diagram illustrating an example of the determination process. In the determination process, the determination unit 209 sequentially executes an acceleration/deceleration determination process (S121), a steering determination process (S122), and an other determination process (S123). The order of the processes in the determination process (S120) may be changed as appropriate.

Figure 11:
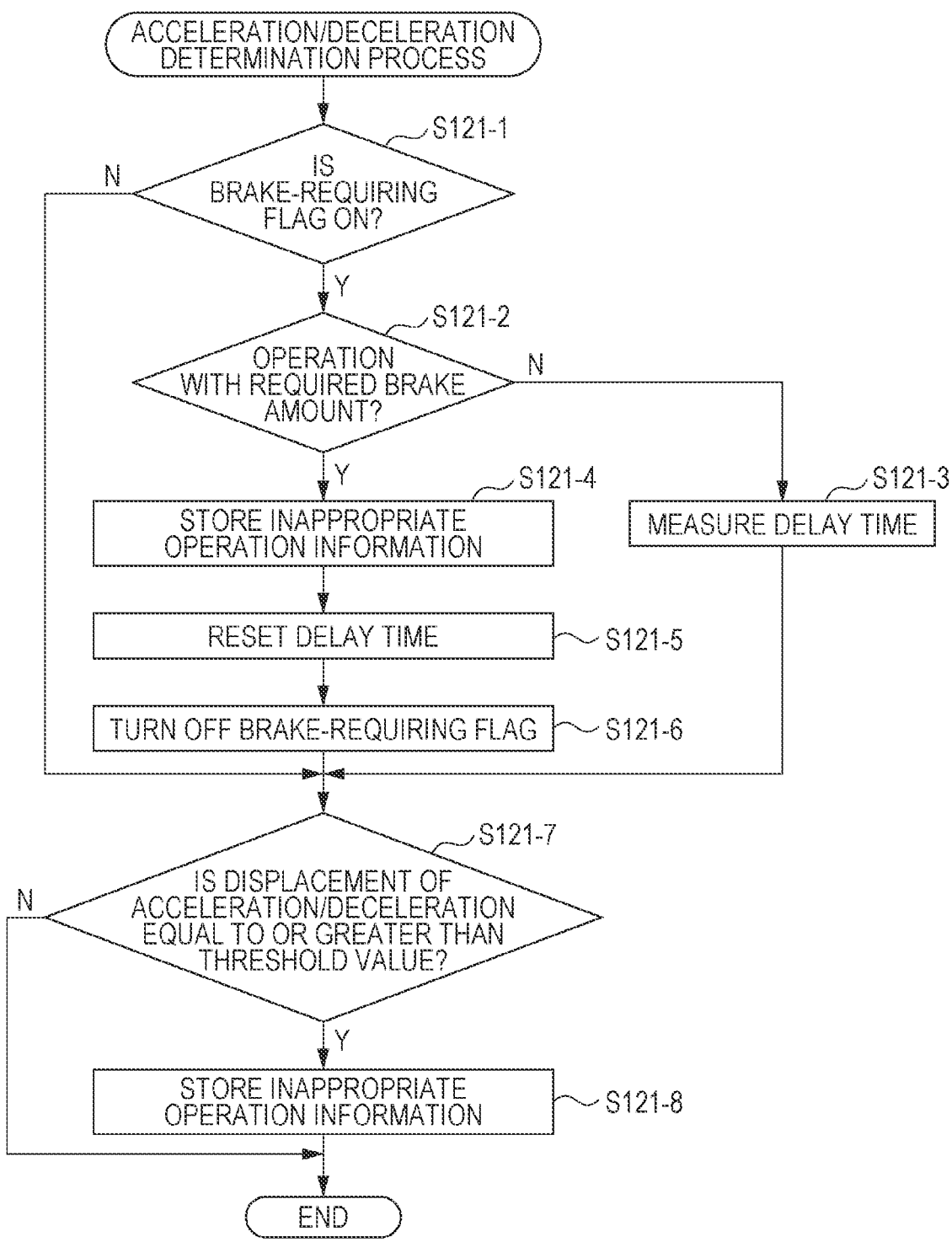
FIG. 11 is a diagram illustrating an example of an acceleration/deceleration determination process.

FIG. 11 is a diagram illustrating an example of the acceleration/deceleration determination process. When the brake-requiring flag is on (YES in S121-1), the determination unit 209 determines whether there is a brake operation with the required brake amount (S121-2). The determination unit 209 determines whether the current amount of depression of the brake pedal 15 is equal to or greater than the required brake amount, based on the driving operation information stored in S100-8.

When there is no brake operation with the required brake amount (NO in S121-2), the timer unit 211 measures the delay time (S121-3). Specifically, the control device 100 includes a counter that measures the delay time. The timer unit 211 measures the delay time by incrementing the counter value of the counter.

When there is a brake operation with the required brake amount (YES in S121-2), the inappropriate operation information accumulation unit 213 stores the inappropriate operation information in the temporary storage area 109*a*. Here, the delay time measured in S121-3 is stored as the inappropriate operation information. Next, the timer unit 211 resets the measured time (S121-5). Next, the determination unit 209 turns off the brake-requiring flag (S121-6).

In addition, the determination unit 209 determines whether the time displacement of acceleration/deceleration of the vehicle 1 is equal to or greater than a threshold value, based on the displacement of the travel information derived in S100-6 (S121-7). That is, the determination unit 209 determines whether sudden acceleration or sudden braking has been performed. When the time displacement of acceleration/deceleration is equal to or larger than the threshold value (YES in S121-7), the inappropriate operation information accumulation unit 213 stores the inappropriate operation information in the temporary storage area 109a. Here, number-of-times information indicating the number of times of sudden acceleration or sudden braking is stored as the inappropriate operation information.

The determination unit 209 may determine whether the time displacement of acceleration/deceleration is equal to or greater than the threshold value, based on the driving operation information, instead of the travel information or in addition to the travel information. For example, when the amount of depression of the accelerator pedal 13 is equal to or larger than a threshold value, the determination unit 209 may determine that sudden acceleration has occurred. In addition, for example, when the amount of depression of the brake pedal 15 is equal to or greater than a threshold value, the determination unit 209 may determine that sudden deceleration has occurred.

Figure 12:
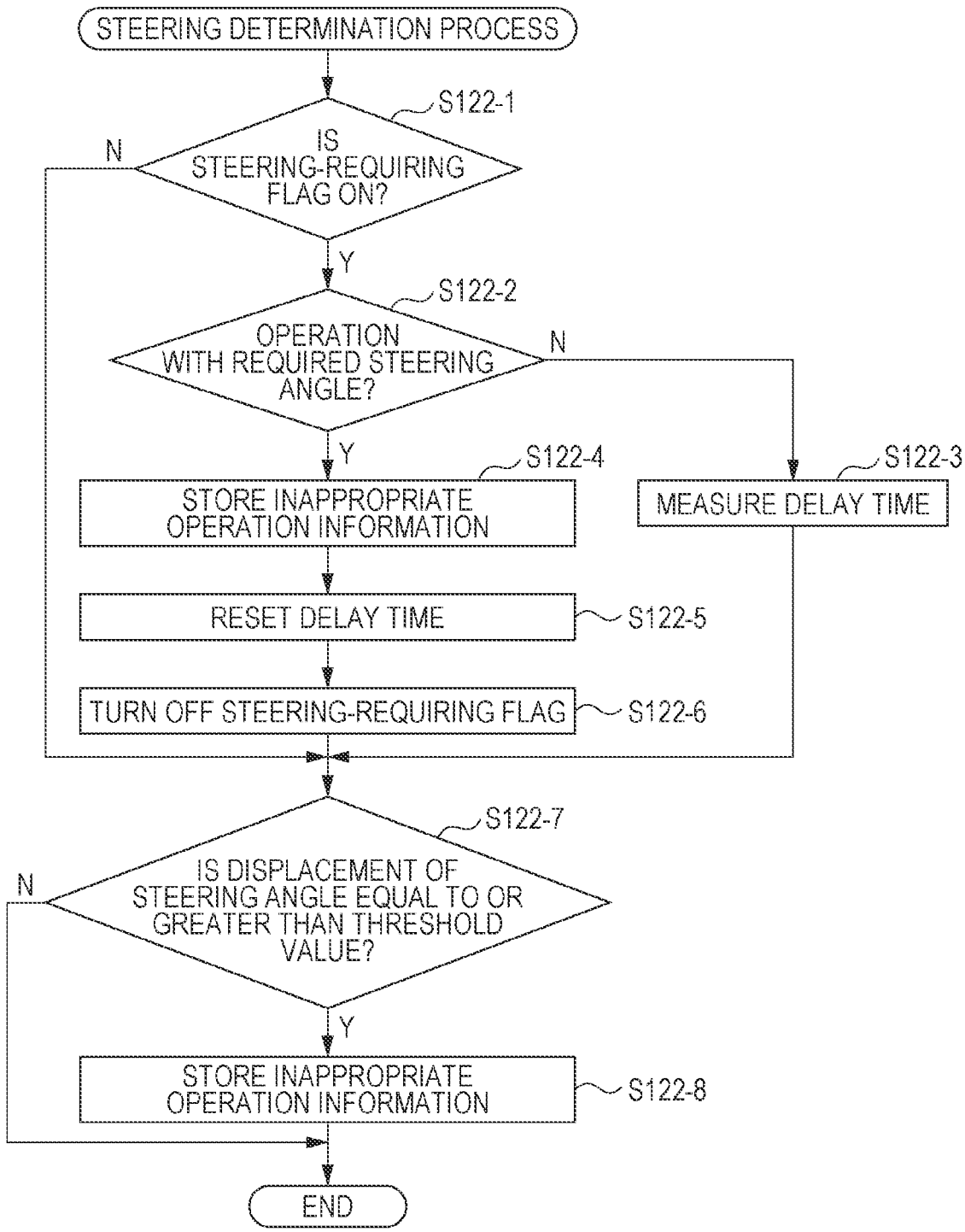
FIG. 12 is a diagram illustrating an example of a steering determination process.

FIG. 12 is a diagram illustrating an example of the steering determination process. When the steering-requiring flag is turned on (YES in S122-1), the determination unit 209 determines whether there is a steering operation with the required steering angle (S122-2). Here, the determination unit 209 determines whether the current steering angle of the steering wheel 11 is equal to or greater than the required steering angle, based on the driving operation information stored in S100-8.

When there is no steering operation with the required steering angle (NO in S122-2), the timer unit 211 measures the delay time (S122-3). Specifically, the control device 100 includes a counter that measures the delay time. The timer unit 211 measures the delay time by incrementing the counter value of the counter. The counter for measuring the delay time of the steering operation is provided separately from the counter for measuring the delay time of the brake operation.

When there is a steering operation with the required steering angle (YES in S122-2), the inappropriate operation information accumulation unit 213 stores the inappropriate operation information in the temporary storage area 109a. Here, the delay time measured in S122-3 is stored as the inappropriate operation information. Next, the timer unit 211 resets the measured time (S122-5). Next, the determination unit 209 turns off the steering-requiring flag (S122-6).

In addition, the determination unit 209 determines whether the time displacement of the steering angle is equal to or greater than a threshold value, based on the driving operation information (S122-7). That is, here, the determination unit 209 determines whether sudden turning has been performed. When the time displacement of the steering angle is equal to or larger than the threshold value (YES in S122-7), the inappropriate operation information accumulation unit 213 stores the inappropriate operation information in the temporary storage area 109a (S122-8). Here, the number-of-times information indicating the number of times of sudden turning is stored as the inappropriate operation information.

In the determination process (S120), as described above, in the acceleration/deceleration determination process (S121), the determination unit 209 determines whether the brake operation has been appropriately performed. Further, in the steering determination process (S122), the determination unit 209 determines whether the steering operation has been appropriately performed. In the other determination process (S123), the determination unit 209 determines whether any other driving operation other than the brake operation and the steering operation has been appropriately performed. For example, in S123, the determination unit 209 determines whether the shift position has not been operated at an appropriate timing, whether the direction indicator has not been turned on at an appropriate timing, and the like.

Further, for example, the number of times of steering correction may be stored as the inappropriate operation information. The steering correction is, for example, steering the steering wheel 11 in the right direction before and/or after steering the steering wheel 11 in the left direction, while the vehicle 1 travels on a left curve. That is, in a case where steering in a direction opposite to a required steering direction is performed, if a steering angular velocity in the opposite direction is equal to or greater than a threshold value, the number of times of steering correction is incremented. Even in the case of steering in the same direction as the required steering direction, the number of times of steering correction may be incremented as long as the steering angular velocity is equal to or greater than the threshold value.

Figure 13:
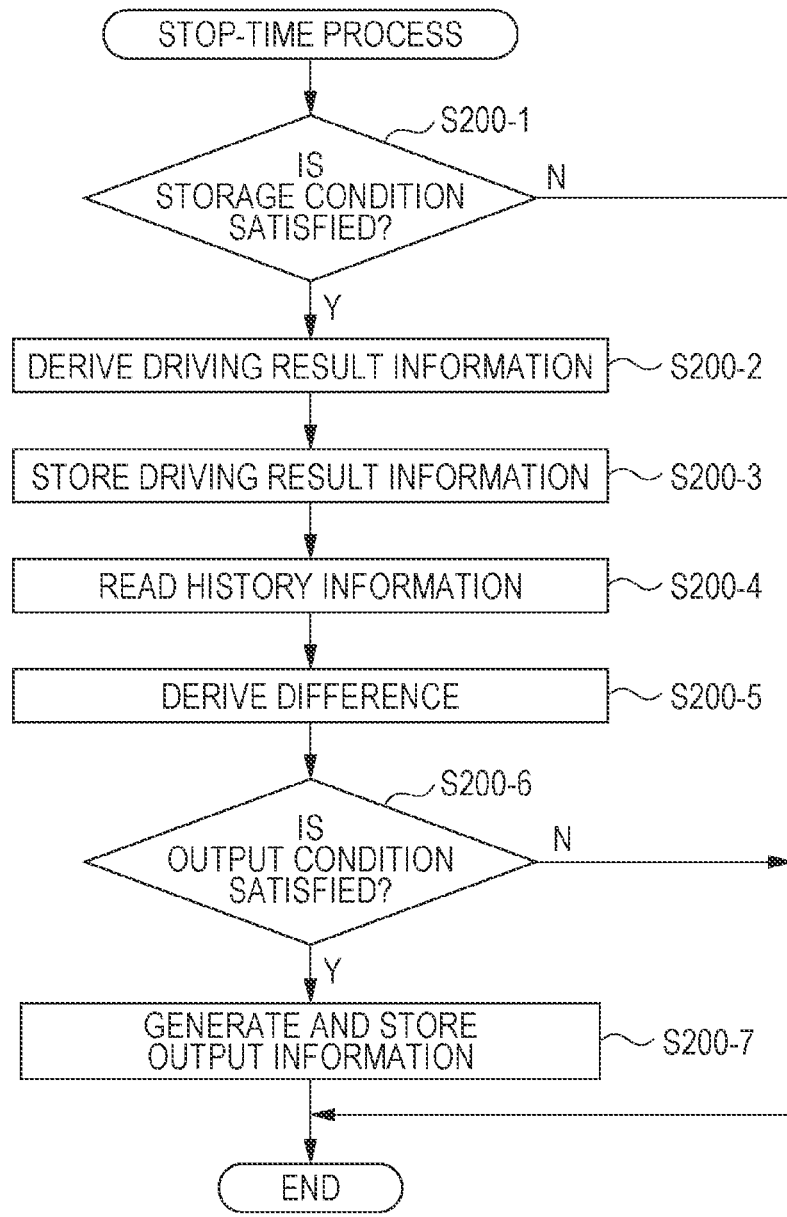
FIG. 13 is a diagram illustrating an example of a stop-time process.

FIG. 13 is a diagram illustrating an example of the stop-time process. As described above, the stop-time process (S200) is executed when the engine 23 is stopped. When the engine 23 is stopped, the processor 101 determines whether a storage condition is satisfied (S200-1). The storage condition is a condition for storing the driving result information in the history information storage area 109b as the history information. Examples of the storage condition include a condition that the travel distance or the travel time is equal to or greater than a threshold value, a condition that the driver has been registered, a condition that the age of the driver is equal to or greater than a threshold value, and a condition that one or both of the number of brake-requiring timings and the number of steering-requiring timings are equal to or greater than respective threshold values.

When the storage condition is satisfied (YES in S200-1), the driving result information deriving unit 215 derives the driving result information (S200-2). For example, the driving result information deriving unit 215 calculates the score based on the inappropriate operation information stored in the temporary storage area 109a. Note that a method for calculating the score is not particularly limited. For example, the score is calculated with the total time of the delay times and the number of pieces of the stored inappropriate operation information being weighted. Here, both the derived score and the inappropriate operation information are included in the driving result information.

Next, the driving result information storage unit 217 stores the driving result information derived in S200-2 in the history information storage area 109b (S200-3). Here, the driving result information storage unit 217 stores the driving result information and the physical information in the history information storage area 109b in association with the driver identification information.

Next, the history information reading unit 219 reads the history information stored in the history information storage area 109b in accordance with the reading condition (S200-4). Next, the difference deriving unit 221 derives a difference between the driving result information derived in S200-2 and the history information read in S200-4 (S200-5). Here, the difference deriving unit 221 derives, for example, a difference between scores, for example, the score in the driving result information and the score in the history information. That is, the difference deriving unit 221 derives a comparison result between the driving result information and the history information.

Then, the output information generation unit 223 determines whether an output condition is satisfied (S200-6). Examples of the output condition include a condition that the difference derived in S200-5 is equal to or greater than a threshold value, that the difference in the scores is equal to or greater than a threshold value. When determining that the output condition is satisfied (YES in S200-6), the output information generation unit 223 generates the output information and stores the output information in the storage device 109 (S200-7). That is, the output information generation unit 223 generates the output information based on the difference between the driving result information and the history information read from the history information storage area 109b. In other words, the output information generation unit 223 generates the output information based on the comparison result between the driving result information and the history information. The output information generation unit 223 stores the driver identification information, that is, the driver ID, in association with the output information.

Figure 14:
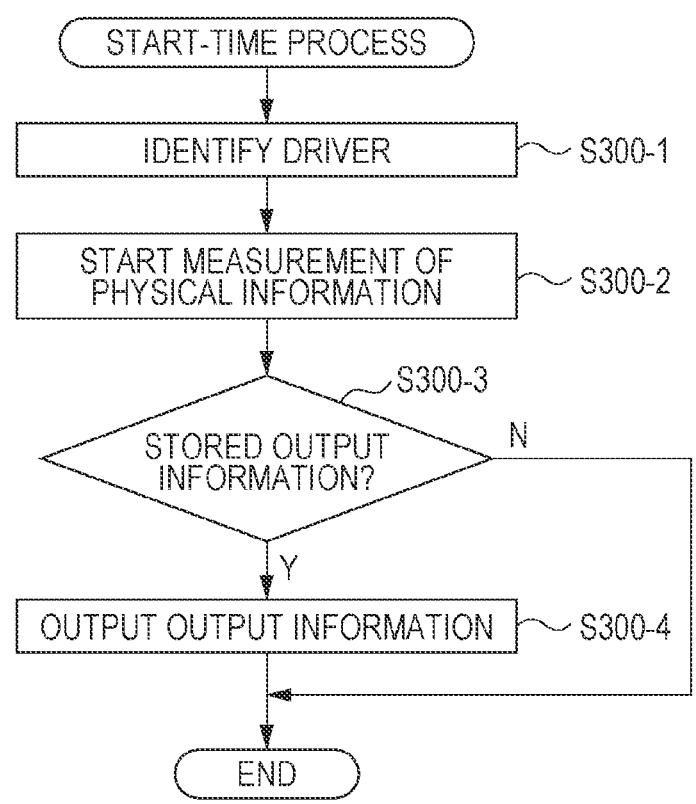
FIG. 14 is a diagram illustrating an example of a start-time process.

FIG. 14 is a diagram illustrating an example of the start-time process. As described above, the start-time process (S300) is executed when the engine 23 is started. The driver identification unit 225 identifies the driver based on the interior information (S300-1). Although detailed description is omitted, the face authentication image and the driver ID are stored in the storage device 109 in association with each other. Here, the face authentication image stored in the storage device 109 is extracted from the interior information, and the driver ID corresponding to the extracted face authentication image is stored in the temporary storage area 109a. When no face authentication image is extracted, a new driver ID is stored in the storage device 109 in association with a new face authentication image. In S200-3 described above, the driving result information is stored with reference to the driver ID stored in the S300-1.

Next, the measurement unit 227 starts measurement of the physical information of the driver (S300-2).

Next, the output unit 229 determines whether the output information associated with the same driver ID as that of the driver identified in S300-1 is stored in the storage device 109 (S300-3). That is, here, the output unit 229 determines whether the output information for the driving operation performed in the past by the driver identified in the start-time process is stored. When the output information is stored (YES in S300-3), the output unit 229 outputs the output information (S300-4). Here, the output information stored at the end of the previous driving of the driver identified in the start-time process is displayed on the display 7a of the navigation system 7.

Here, the output information is generated in the stop-time process and output in the start-time process. However, the timing of generation and output of the output information is not limited to this. For example, the output information may be output when the engine 23 is stopped, or the output information may be output while the vehicle 1 is driven. In this example, the inappropriate operation information is accumulated while the vehicle 1 is driven, and the driving result information is derived based on the accumulated inappropriate operation information. However, the driving result information may be updated while the vehicle 1 is driven, and the score may be updated every time an inappropriate driving operation is performed.

As described above, according to the vehicle 1 of the embodiment, the driving operation of the driver is compared with the past driving operation of the driver himself/herself. Therefore, the driver can easily notice the decline in driving skill, based on the output information. Therefore, according to the vehicle 1 of the embodiment, it is possible to appropriately alert the driver. In addition, for example, an elderly driver may be motivated to give up his/her driver's license or stop driving.

In addition, in the above-described embodiment, the history information which takes the physical information into account is read. As a result, since the driving operations in the same health state are compared, more appropriate driving result information is derived.

In the above-described embodiment, a more suitable vehicle type is proposed to the driver. As a result, it is possible to enhance the safety of future driving.

Although the embodiment of the present invention has been described with reference to the accompanying drawings, it is needless to say that the present invention is not limited to the embodiment. It will be apparent to those skilled in the art that various changes and modifications can be made without departing from the scope as defined by the appended claims and that such changes and modifications also fall within the technical scope of the present invention.

In the above-described embodiment, the display 7a and the operation receiving unit 7b of the navigation system 7 are included in the control device 100 that evaluates the driving skill of the driver. Alternatively, the control device 100 may be provided as a function of the navigation system 7. In other words, the navigation system 7 may function as the control device 100 that evaluates the driving skill of the driver.

In the above-described embodiment, the steering wheel 11, the accelerator pedal 13, the brake pedal 15, and the shift lever 17 are provided as the driving operation units each of which receives the driving operation of the driver. However, the driving operation units described above are merely examples. One or more of the steering wheel 11, the accelerator pedal 13, the brake pedal 15, and the shift lever 17 may be provided as a driving operation unit or driving operation units, or a driving operation unit different from these may be disposed.

Further, in the above-described embodiment, the exterior cameras 3 and the radar sensor 33 are provided as the input device 113 that receives an input of information on a scene exterior to the vehicle 1. A signal is input to the control device 100 from the input device 113. Then, the appropriateness information deriving unit 207 derives the appropriateness information including at least one of the appropriate operation timing, operation amount, or operation time of the driving operation unit, based on the signal input from the input device 113. The inappropriate operation information accumulation unit 213 and the driving result information deriving unit 215 derive the inappropriate operation information, that is, the driving result information, based on the driving operation information and the appropriateness information. Further, the inappropriate operation information accumulation unit 213 derives the inappropriate operation information also based on only the driving operation information.

However, the input device 113 is not essential. The inappropriate operation information accumulation unit 213 may derive the inappropriate operation information based on only the driving operation information. For example, the inappropriate operation information accumulation unit 213 may derive only the number of times of sudden acceleration, sudden braking, and sudden turning as the inappropriate operation information. Further, as the input device 113 for identifying the exterior information, only one of the exterior camera 3 and the radar sensor 33 may be provided, or a device different from these may be provided.

In the above-described embodiment, the output information includes the proposal information of a vehicle type, and the vehicle type proposed by the proposal information is varied according to the driving result information or the comparison result. However, the proposal information is not essential.

In addition, in the above-described embodiment, the measurement device 9 that measures the physical information of the driver is provided, and the output information is output based on the signal input from the measurement device 9, the driving result information, and the history information. However, the measurement device 9 is not essential.

Further, in the above-described embodiment, the driver is identified, and whether the output information can be output is determined according to the driver. However, the identification of the driver is not essential. For example, in a case where the number of occupants for the vehicle 1 is limited to one, it is not necessary to identify the driver.

In the above-described embodiment, the output information may include information indicating an inappropriate driving operation of any driving operation unit, that is, the inappropriate operation information. That is, the driver may be notified of what driving operation is inappropriate. For example, in the above-described embodiment, the driver may be notified of a delay in the brake operation, a delay in the steering operation, the content of an inappropriate driving operation that has occurred, such as sudden acceleration or sudden braking, the number of times such an inappropriate driving operation has occurred, and the like.

In addition, in the above-described embodiment, the processor 101 may output the output information to an external device through wireless communication. Examples of the external device to which the output information is output include a mobile terminal owned by the driver and a terminal of a user different from the driver. Examples of the user different from the driver include relatives such as a spouse and a child of the driver. For example, an output destination of the output information, such as an e-mail address, is registered in advance in the control device 100, and the output information is output to the registered output destination. Thus, giving up of the driver's license and safe driving are further promoted, and social safety is improved.

Further, programs in the above-described embodiment and various modifications may be stored in a computer-readable storage medium and provided as a storage medium. In addition, the above-described embodiment and modifications may provide a control method that implements each function and the steps illustrated in the flowcharts.

The invention claimed is:

1. A vehicle comprising:
    at least one driving operation unit that is a vehicle control configured to allow a driver to operate the vehicle for driving;
    at least one sensor configured to detect a driver input to the at least one driving operation unit for driving the vehicle; and
    a measurement device configured to obtain physical information of the driver; and
    a control device coupled to the at least one sensor and the measurement device,
    wherein the control device comprises:
        one or more processors; and
        a storage device including one or more memories that are coupled to the one or more processors and store instructions, when executed by the one or more processors, causing the one or more processors to be configured to:
            generate, based on i) a delay period of time of the driver input to the at least one driving operation unit from an appropriate timing of the driver input to the at least one driving operation unit, and ii) a number of times the driver input to the at least one driving operation unit is considered inappropriate, driving result information for evaluating control of the vehicle performed by the driver;
            store the driving result information in the storage device, as new history information, in association with the physical information measured by the measurement device;
            read previously stored history information from the storage device, based on the physical information; and
            compare the new history information with the previously stored history information and generate output information based on a comparison result,
    wherein the output information comprises proposal information of a vehicle type, and
    wherein the one or more processors are configured to vary the vehicle type proposed by the proposal information according to the driving result information or the comparison result, and
    wherein the previously stored history information is associated with the physical information that most similar to the physical information associated with the new history information.

2. The vehicle according to claim 1, wherein the at least one driving operation unit comprises at least one of a steering wheel, an accelerator pedal, a brake pedal, or a shift lever.

3. The vehicle according to claim 1, further comprising an input device configured to receive an input of information on a scene exterior to the vehicle, wherein the one or more processors are configured to:
    receive a signal input relating to the input from the input device;
    based on the signal input from the input device, generate appropriateness information comprising at least one of the appropriate timing of the driver input to the at least one driving operation unit, the number of times the driver input to the at least one driving operation unit, or a time period during which the driver input is continued to the at least one driving operation unit; and
    generate the driving result information based on the appropriateness information and the signal input from the at least one sensor.

4. The vehicle according to claim 1, wherein
    the driving result information is a score, and
    the output information comprises at least one of the score, a transition of the score, or a ranking based on the score.

5. The vehicle according to claim 1, wherein the physical information comprises at least one of a body temperature of the driver, a heart rate of the driver, or a blood pressure of the driver.

6. The vehicle according to claim 1, wherein the physical information comprises at least one of a body temperature of the driver, a heart rate of the driver, or a blood pressure of the driver.

7. The vehicle according to claim 1, wherein the output information comprises information indicating an inappropriate driving operation performed on the at least one driving operation unit.

8. The vehicle according to claim 1, wherein the one or more processors are configured to output the output information to an external device through wireless communication.

9. The vehicle according to claim 8, wherein the external device comprises a terminal of a user different from the driver.

* * * * *